United States Patent
Chen et al.

(10) Patent No.: US 9,207,387 B2
(45) Date of Patent: Dec. 8, 2015

(54) BACKLIGHT MODULE AND LIQUID CRYSTAL DISPLAY DEVICE

(71) Applicant: InnoLux Corporation, Miao-Li County (TW)

(72) Inventors: Cheng-Kung Chen, Miao-Li County (TW); Wen-Yu Lin, Miao-Li County (TW); Hsien Wen Chang, Miao-Li County (TW); Yuan-Sheng Chien, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 62 days.

(21) Appl. No.: 13/804,391

(22) Filed: Mar. 14, 2013

(65) Prior Publication Data

US 2013/0258249 A1  Oct. 3, 2013

(30) Foreign Application Priority Data

Mar. 29, 2012 (TW) .............................. 101111002 A (51) Int. Cl.
  *G02F 1/1333* (2006.01)
  *G02F 1/1335* (2006.01)
  *F21V 8/00* (2006.01)

(52) U.S. Cl.
  CPC ............ *G02B 6/0068* (2013.01); *G02B 6/0031* (2013.01); *G02B 6/002* (2013.01); *G02B 6/0088* (2013.01); *G02B 6/0091* (2013.01)

(58) Field of Classification Search
  CPC combination set(s) only.
  See application file for complete search history.

(56) References Cited

U.S. PATENT DOCUMENTS

| | | | |
|---|---|---|---|
| 7,325,959 B2 * | 2/2008 | Tsai | 362/625 |
| 7,649,590 B2 * | 1/2010 | Park et al. | 349/65 |
| 2010/0290246 A1 * | 11/2010 | Kim et al. | 362/602 |
| 2012/0182498 A1 * | 7/2012 | Jung et al. | 349/62 |
| 2012/0294034 A1 * | 11/2012 | Kim et al. | 362/606 |
| 2013/0093978 A1 | 4/2013 | Chen et al. | |

FOREIGN PATENT DOCUMENTS

| | | |
|---|---|---|
| CN | 101725908 | 6/2010 |
| CN | 102323693 | 1/2012 |
| TW | 530956 | 5/2003 |
| TW | 1356204 | 1/2012 |

OTHER PUBLICATIONS

Taiwanese language office action dated Aug. 20, 2014.
English language translation of abstract of TW 530956 (published May 1, 2003).

(Continued)

*Primary Examiner* — Wen-Ying P Chen
(74) *Attorney, Agent, or Firm* — McClure, Qualey & Rodack, LLP (57) ABSTRACT

A back light module is provided, which includes a light guide plate, a first light source device and a second light source device. The light guide plate has a first side surface, a second side surface and a third side surface, wherein the first side surface is opposite to the third side surface, and the second side surface is orthogonal to the first and third side surfaces. The first lighting device is disposed at two sides of an intersection corner of the first and second side surfaces and faces the first and second side surfaces. The second light source device is disposed at two sides of an intersection corner of the second and third side surfaces and faces the second and third side surfaces.

10 Claims, 10 Drawing Sheets

(56) References Cited

OTHER PUBLICATIONS

Chinese language office action dated Dec. 2, 2014.
English language translation of abstract of CN 101725908 (published Jun. 9, 2010).
English language translation of abstract of CN 102323693 (published Jan. 18, 2012).
Taiwanese language office action dated Apr. 9, 2015, issued in TW Application No. 101111002.

* cited by examiner

BACKLIGHT MODULE AND LIQUID CRYSTAL DISPLAY DEVICE

CROSS REFERENCE TO RELATED APPLICATIONS

This Application claims priority of Taiwan Patent Application No. 101111002, filed on Mar. 29, 2012, the entirety of which is incorporated by reference herein.

BACKGROUND OF THE INVENTION

1. Field of the Invention

The present invention relates to a backlight module, and in particular relates to a corner-lit backlight module.

2. Description of the Related Art

Liquid crystal displays (LCDs) are widely used in various electronic products such as monitors for notebook computers, digital cameras, and projectors, and the demand for backlight modules has increased tremendously. However, the liquid crystal display panel used in liquid crystal displays cannot emit light by itself. Rather, the liquid crystal display panel has to pair with a backlight module to light the screen evenly. The purpose of the backlight module is to provide a sufficient brightness and an even distribution of light on surface to the liquid crystal display panel.

Figure 1:
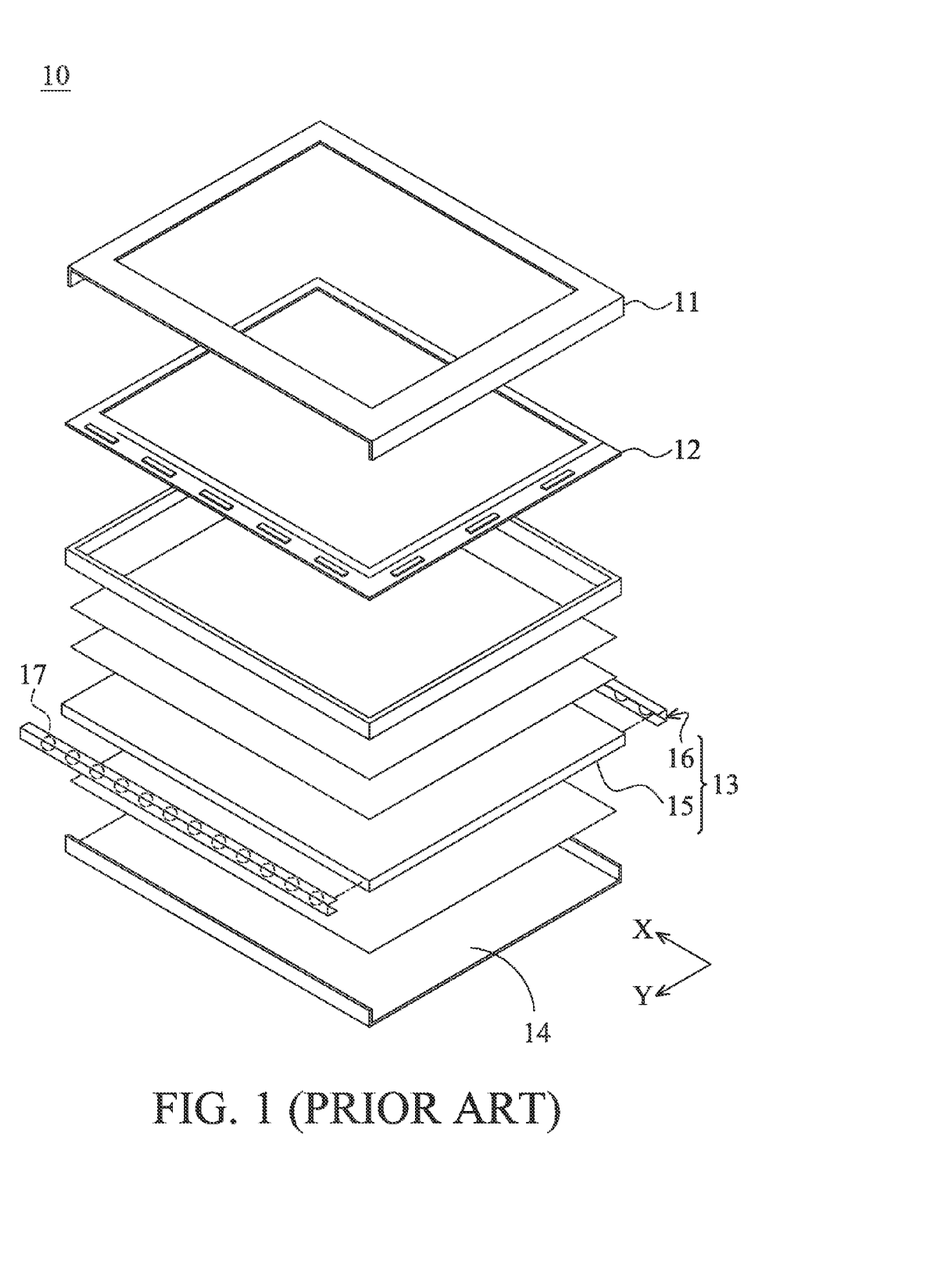
FIG. 1 is an exploded view of a prior art backlight module.

In addition to cold cathode fluorescent lamps (CCFLs), light-emitting diodes (LEDs) are increasingly used in medium and large-size liquid crystal displays. Referring to FIG. 1, an exploded view of a prior art backlight module is provided. A typical LCD 1 includes a front bezel 11, a liquid crystal panel 12, a backlight module 13 and a rear bezel 14. The backlight module 13 and the liquid crystal panel 12 are sandwiched between the front bezel 11 and the rear bezel 15. The backlight module 13 includes a light guide plate 15 and two lighting devices 16. A large number of LEDs 17 are disposed on the two lighting devices 16 which respectively face two long side surfaces (or a short side surface) of the light guide plate 15 to provide sufficient light thereto without generation of hotspots.

However, the expensive LEDs generally add to the cost of liquid crystal displays. Thus, how to reduce the number of LEDs used in backlight modules in order to reduce the manufacturing cost of liquid crystal displays is a main goal for manufactures.

BRIEF SUMMARY OF THE INVENTION

In order to overcome the problems of the prior art, this invention provides the below backlight module, in which lighting devices are disposed at two sides of the intersection corners of two side surfaces of the light guide plate.

As one of the objectives, this invention provides a backlight module, which includes a light guide plate, a first light source device, and a second light source device. The light guide plate has a first side surface, a second side surface, and a third side surface, wherein the first side surface is opposite to the third side surface, and the second side surface is orthogonal to the first and third side surfaces. The first lighting device is disposed at two sides of an intersection corner of the first and second side surfaces and faces the first and second side surfaces. The second light source device is disposed at two sides of an intersection corner of the second and third side surface and faces the second and third side surfaces.

In one embodiment, the first lighting device includes a first longitudinal plate, a first horizontal plate, and a plurality of first light sources. The first longitudinal plate faces the first side surface. The first horizontal plate faces the second side surface, wherein each of the first longitudinal plate and the first horizontal plate has at least one of the first light sources disposed thereon. The second light source device includes a second longitudinal plate, a second horizontal plate, and a plurality of second light sources. The second longitudinal plate faces the third side surface. The second horizontal plate faces the second side surface, wherein each of the second longitudinal plate and the second horizontal plate has at least one of the second light sources disposed thereon.

In one embodiment, the length of light incident surfaces, configured for receiving light, of each of the first, second and third side surfaces is less than half of a total length of the corresponding first, second and third side surfaces.

In one embodiment, the above mentioned backlight module further includes a third lighting device and a fourth lighting device, wherein the light guide plate further includes a fourth side surface, opposite to the second side surface and be orthogonal to the first and third side surfaces, wherein the third lighting device is disposed at two sides of an intersection corner of the first and fourth side surfaces and faces the first and fourth side surfaces, and the fourth lighting device is disposed at two sides of an intersection corner of the third and fourth side surfaces and faces the third and fourth side surfaces.

Another objective of this invention is to provide a backlight module, which includes a light guide plate having a first side surface, a second side surface, a third side surface and a fourth side surface, consecutively arranged end to end in that order, wherein the first side surface is opposite to the third side surface, and the second side surface is opposite to the fourth side surface. In the vicinities of the interconnection corners of the first, second, third, and fourth side surfaces, the first, second, third, and fourth side surfaces respectively include a light incident surface configured for receiving light, wherein a length of light incident surfaces of each of the first, second, third, and fourth side surfaces is less than half of a total length of the corresponding first, second, third, and fourth side surfaces. Preferably, the length of light incident surfaces of each of the first, second, third, and fourth side surfaces is less than one-sixth the total length of the corresponding first, second, third, and fourth side surfaces.

Yet another objective of this invention is to provide a liquid crystal display device including the above mentioned backlight module, wherein the second side surface and the fourth side surface is relative to the long side of the liquid crystal display device, and the first side surface and the third side surface is relative to the short side of the liquid crystal display device, wherein the first and third side surfaces are respectively perpendicular to the second side surface.

Because the lighting devices are disposed at two sides of the intersection corners of two side surfaces of the light guide plate, the number of the light sources can be further reduced.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
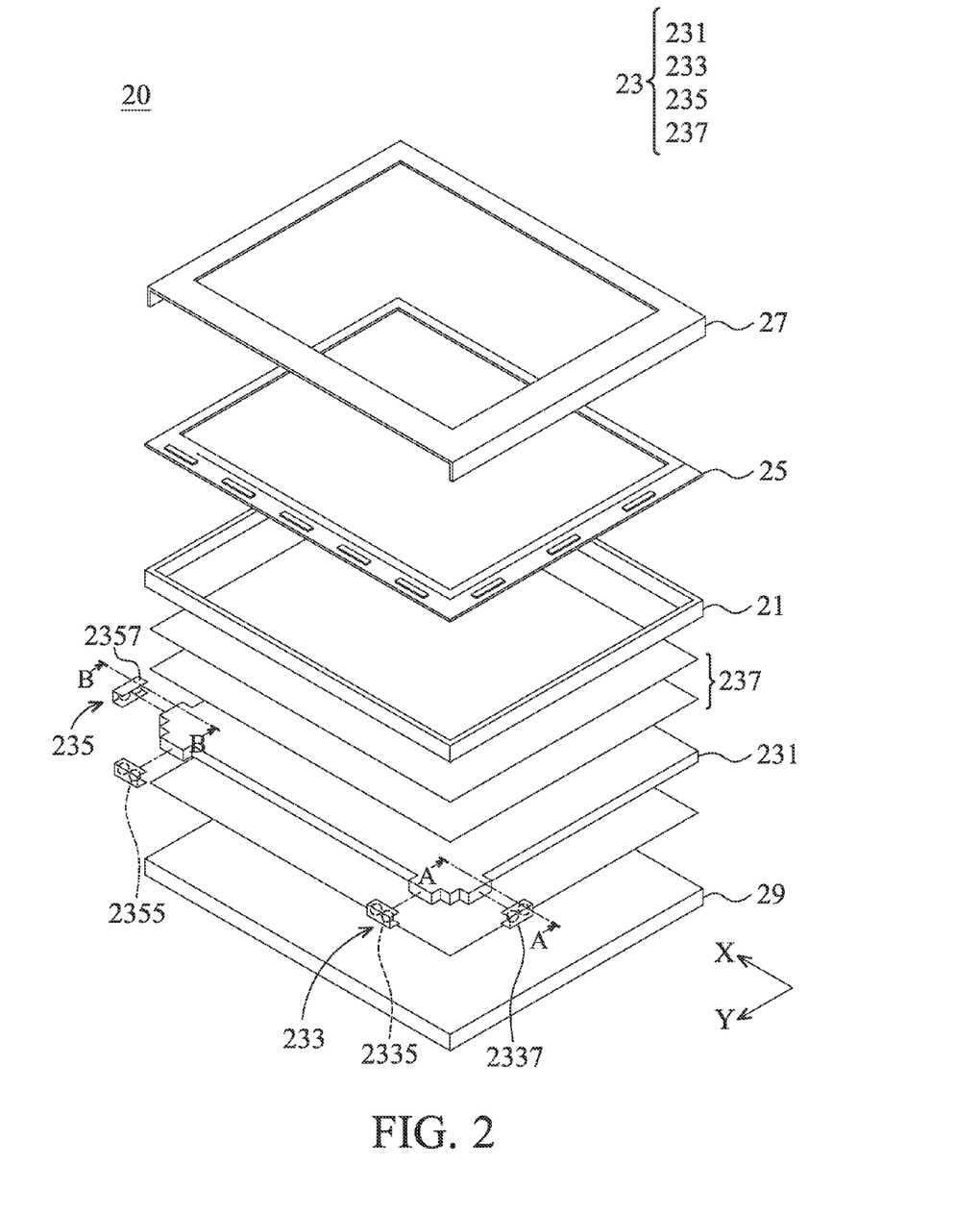
FIG. 2 is an exploded view of the liquid crystal display device of a first embodiment of the present disclosure.

Referring to FIG. 2, a display device 20 in accordance with the preferable embodiment of the present disclosure includes a frame 21, a backlight module 23, a display panel 25, a front bezel 27 and a rear bezel 29. The backlight module 23 is disposed behind the frame 21 and includes a light guide plate 231, a first light source device 233, a second light source device 235 and a plurality of optical films 237.

Figure 3A:
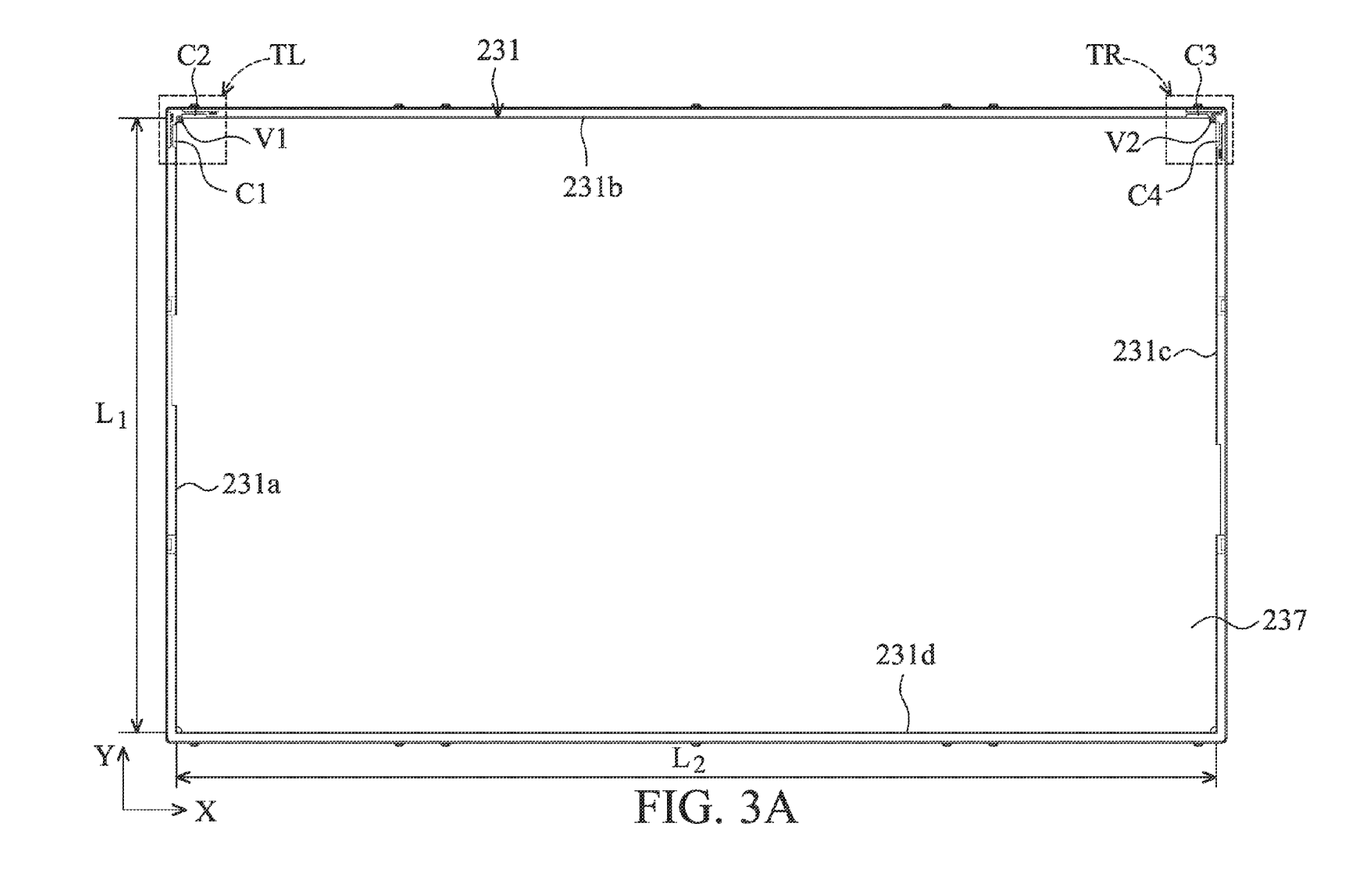
FIG. 3A is a schematic view of partial elements of the liquid crystal display device of the first embodiment of the present disclosure.
Figure 3B:
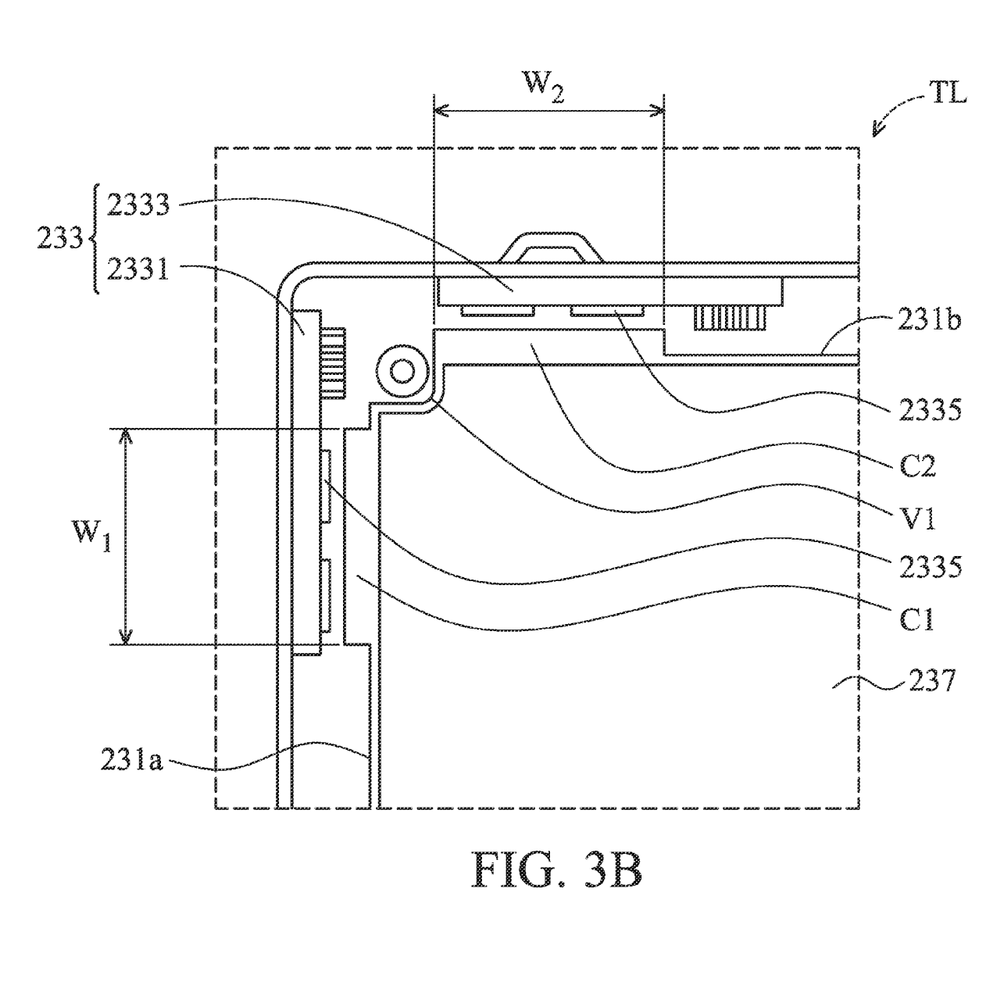
FIG. 3B shows an enlarged view of the circled portion TL of FIG. 3A.
Figure 3C:
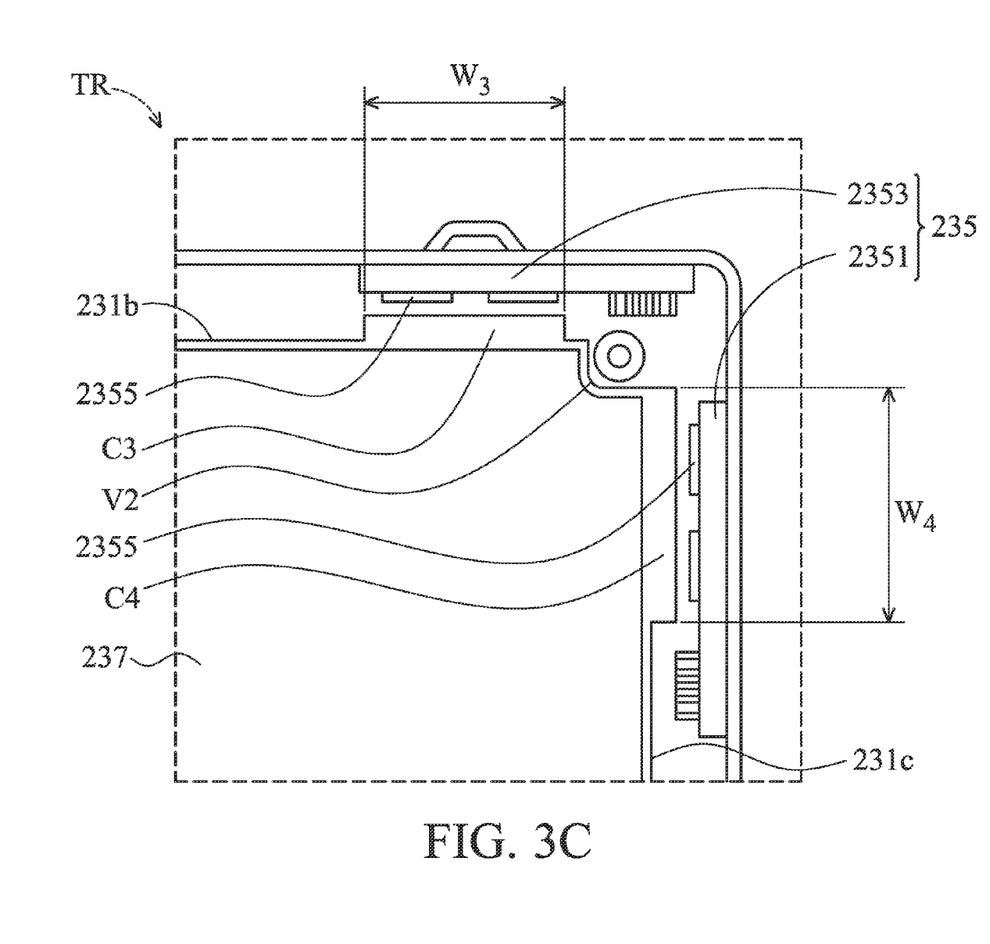
FIG. 3C shows an enlarged view of the circled portion TR of FIG. 3A.

Referring to FIGS. 2 and 3A, the reflective covers 2337 have been omitted in FIG. 3A for the purpose of illustration. The optical film 237 is disposed above the light-emitting surface of the light guide plate 231 to haze light from the light guide plate 231. The light guide plate 231 has a first side surface 231a, a second side surface 231b, a third side surface 231c and a fourth side surface 231d, consecutively arranged end to end in that order, wherein the first side surface 231a is opposite to the third side surface 231c, and the second side surface 231b is opposite to the fourth side surface 231d. In the embodiment, as shown in FIG. 3B, at the vicinity of the intersection corner V1 of the first side surface 231a and the second side surface 231b, the first side surface 231a has a light incident surface C1, and the second side surface 231b has a light incident surface C2. As shown in FIG. 3C, at the vicinity of the intersection corner V2 of the second side surface 231b and the third side surface 231c, the second side surface 231b has a light incident surface C3, and the third side surface 231c has a light incident surface C4.

In one exemplary embodiment, the light guide plate 231 is utilized in an 18.5-inch liquid crystal display device 20. Thus, the second and fourth side surfaces 231b and 231d are relative to the long sides of the liquid crystal display device 20, and the first and third side surfaces 231a and 231c are relative to the short sides of the liquid crystal display device 20, wherein the first and third side surfaces 231a and 231c extend a length $L_1$ in a Y direction, and the second and fourth side surfaces 231b and 231d extend a length $L_2$ in an X direction.

Figure 4A:
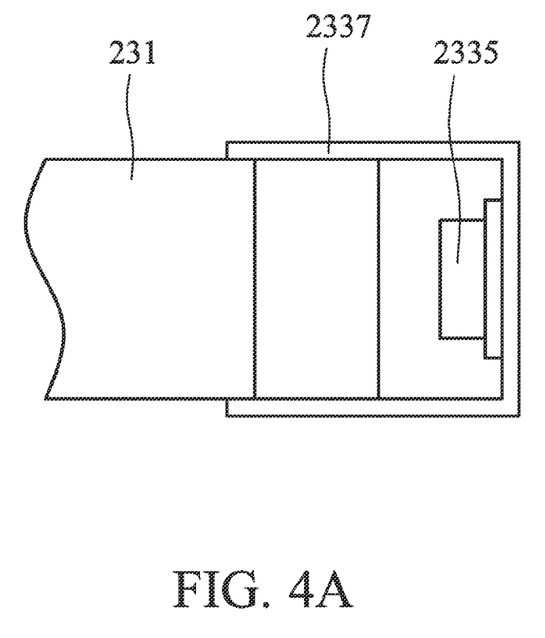
FIG. 4A is a cross-sectional view taken along a line A-A of FIG. 2.

Referring to FIG. 3B, the first lighting device 233 is disposed at two sides of the intersection corner V1 of the first side surface 231a and the second side surface 231b and includes a first longitudinal plate 2331, a first horizontal plate 2333, a plurality of first light sources 2335, and two reflective covers 2337 (as shown in FIG. 2). The first longitudinal plate 2331 is parallel to the first side surface 231a. Two of the first light sources 2335, disposed on the first longitudinal plate 2331, face the light incident surface C1 of the first side surface 231a and project light onto the light incident surface C1. The first horizontal plate 2333 is parallel to the second side surface 231b. Two of the first light sources 2335, disposed on the first horizontal plate 2333, face the light incident surface C2 of the second side surface 231b and project light onto the light incident surface C2. In one exemplary embodiment, a length $W_1$ of light incident surfaces C1 is greater than or equal to one-sixth the total length $L_1$ (as shown in FIG. 3A) of the first side surface 231a, and a length $W_2$ of light incident surfaces C2 is greater than or equal to one-sixth the total length $L_2$ (as shown in FIG. 3A) of the second side surface 231b. The two reflective covers 2337 surround the external side of the first lighting device 233 to reflect light from the first light sources 2335, as shown in FIGS. 2 and 4A.

Figure 4B:
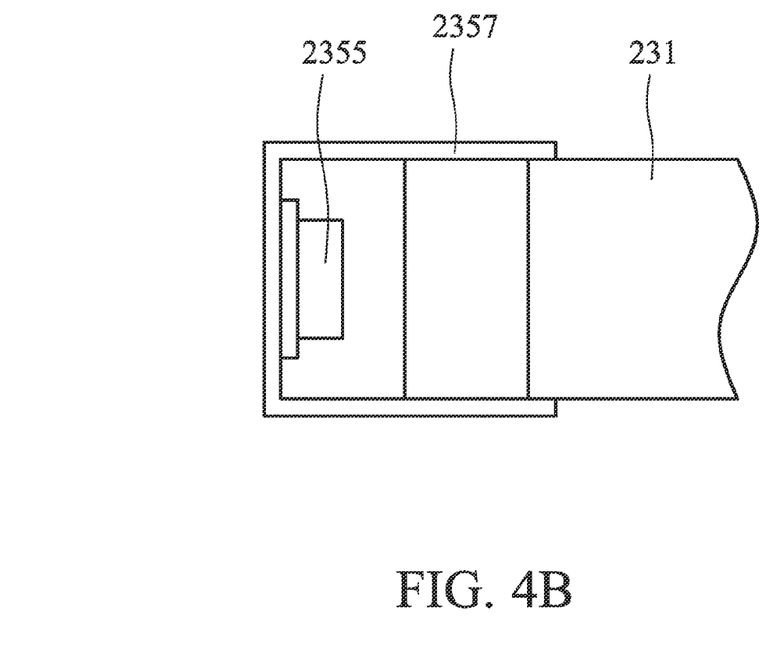
FIG. 4B is a cross-sectional view taken along a line B-B of FIG. 2.

Referring to FIG. 3C, the second light source device 235 is disposed at two sides of the intersection corner V2 of the second side surface 231b and the third side surface 231c and includes a second longitudinal plate 2351, a second horizontal plate 2353, a plurality of second light sources 2355 and two reflective covers 2357 (as shown in FIG. 2). The second longitudinal plate 2331 is parallel to the third side surface 231c. Two of the second light sources 2355, disposed on the second longitudinal plate 2331, face the light incident surface C4 of the third side surface 231c and project light onto the light incident surface C4. The second horizontal plate 2353 is parallel to the second side surface 231b. Two of the second light sources 2355, disposed on the second horizontal plate 2353, face the light incident surface C3 of the second side surface 231b and project light onto the light incident surface C3. In one exemplary embodiment, a length $W_3$ of light incident surfaces C3 is greater than or equal to one-sixth of the total length $L_2$ (as shown in FIG. 3A) of the second side surface 231b, and a length $W_4$ of light incident surfaces C4 is greater than or equal to one-sixth of the total length $L_1$ (as shown in FIG. 3A) of the third side surface 231c. The two reflective covers 2357 surround the external side of the second light source device 235 to reflect light from the second light sources 2355, as shown in FIGS. 2 and 4B.

It is noted that the number of first and second light sources 2335 and 2355 should not be limited to the above embodiment. A different number of first and second light sources 2335 and 2355 may be selected in accordance with different demands or based on the illuminance of the first and second light sources 2335 and 2355. Additionally, the first longitudinal plate 2331 is not directly connected to the first horizontal plate 2333, and the second longitudinal plate 2351 is not directly connected to the second horizontal plate 2353. Thus, the two reflective covers 2337 are not directly connected to each other, and the two reflective covers 2357 are not directly connected to each other.

Figure 5:
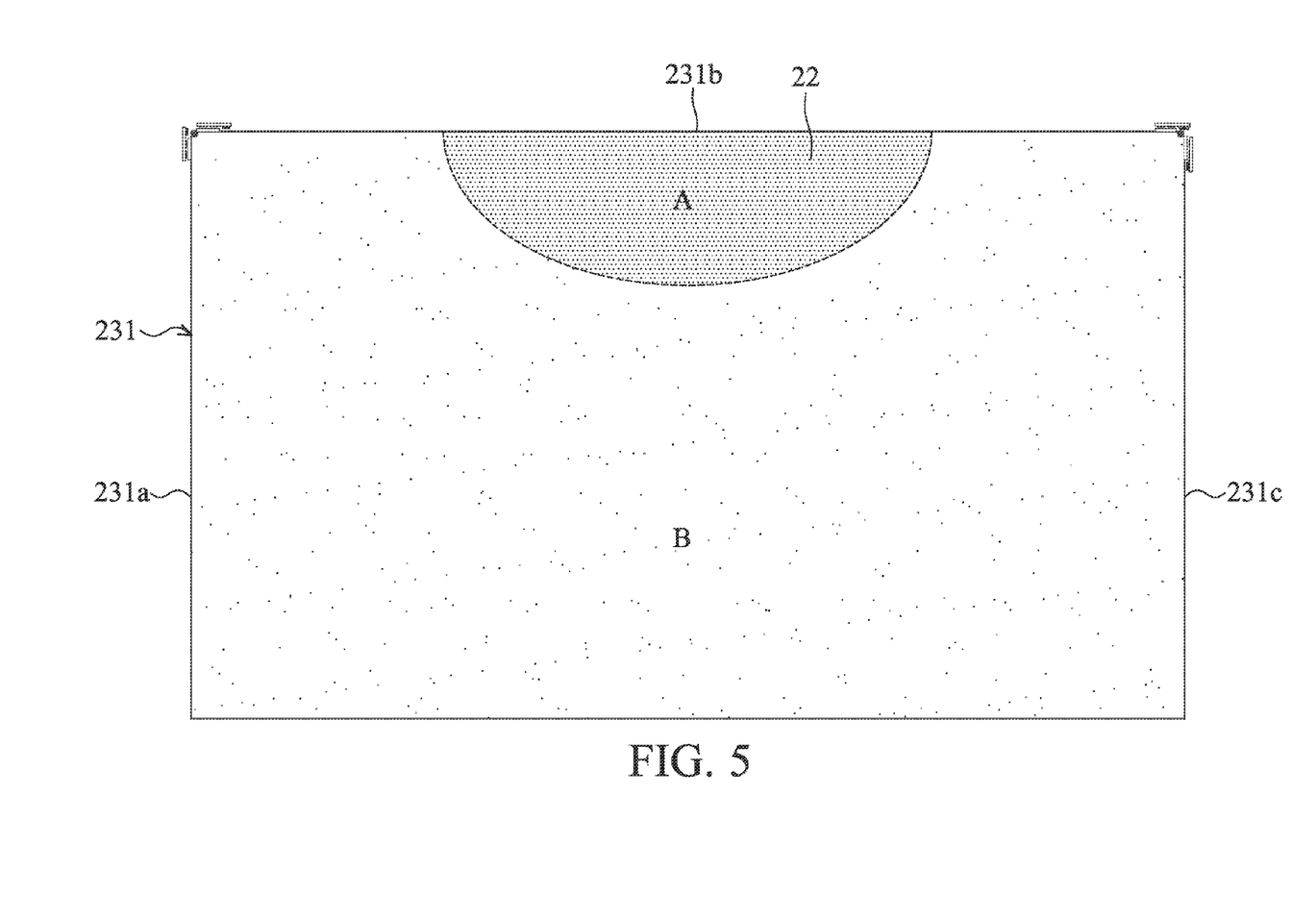
FIG. 5 is a bottom view of elements of the first embodiment of the present disclosure.

Referring to FIG. 5, a bottom view of the light guide plate 231 is shown. To evenly maintain the illuminance on the light-emitting surface of the light guide plate 231, a plurality of the printed dots 22 is dispersed on the bottom surface of the light guide plate 231. The printed dots 22 may be dispersed on the light guide plate randomly. Preferably, compared with an area B, an area A in the FIG. 5 has a higher distribution density of printed dots 22. Specifically, the distribution density of the printed dots at the area A, located at a substantial center of the first and third side surfaces 231a and 231c proximate to the second side surface 231b, is higher than the distribution density of the printed dots at the area B, located proximate to the first or third side surfaces 231a and 231c. The printed dots 32c can change the path of light traveling in the light guide plate 231 and alter the total reflection phenomenon of the light in order to guide the light to the light-emitting surface. The emergent light shape of the light guide plate 231 depends on the type of printed dots 22. In one exemplary embodiment, the printed dots 22 can be the traditionally used white ink or transparent ink, the latter being a better option for printed dots 22 as it concentrates the lights more.

As shown in FIG. 2, the display panel 25 is disposed above the frame 21 to receive light from the light guide plate 231. Since the display panel 25 is well within the knowledge of one skilled in the art, further elaboration will not be presented here regarding the display panel 25. In the assembly of the liquid crystal display device 20, the frame 21, the backlight module 23 and the display panel 25 are sandwiched between the front bezel 27 and the rear bezel 29.

Figure 6:
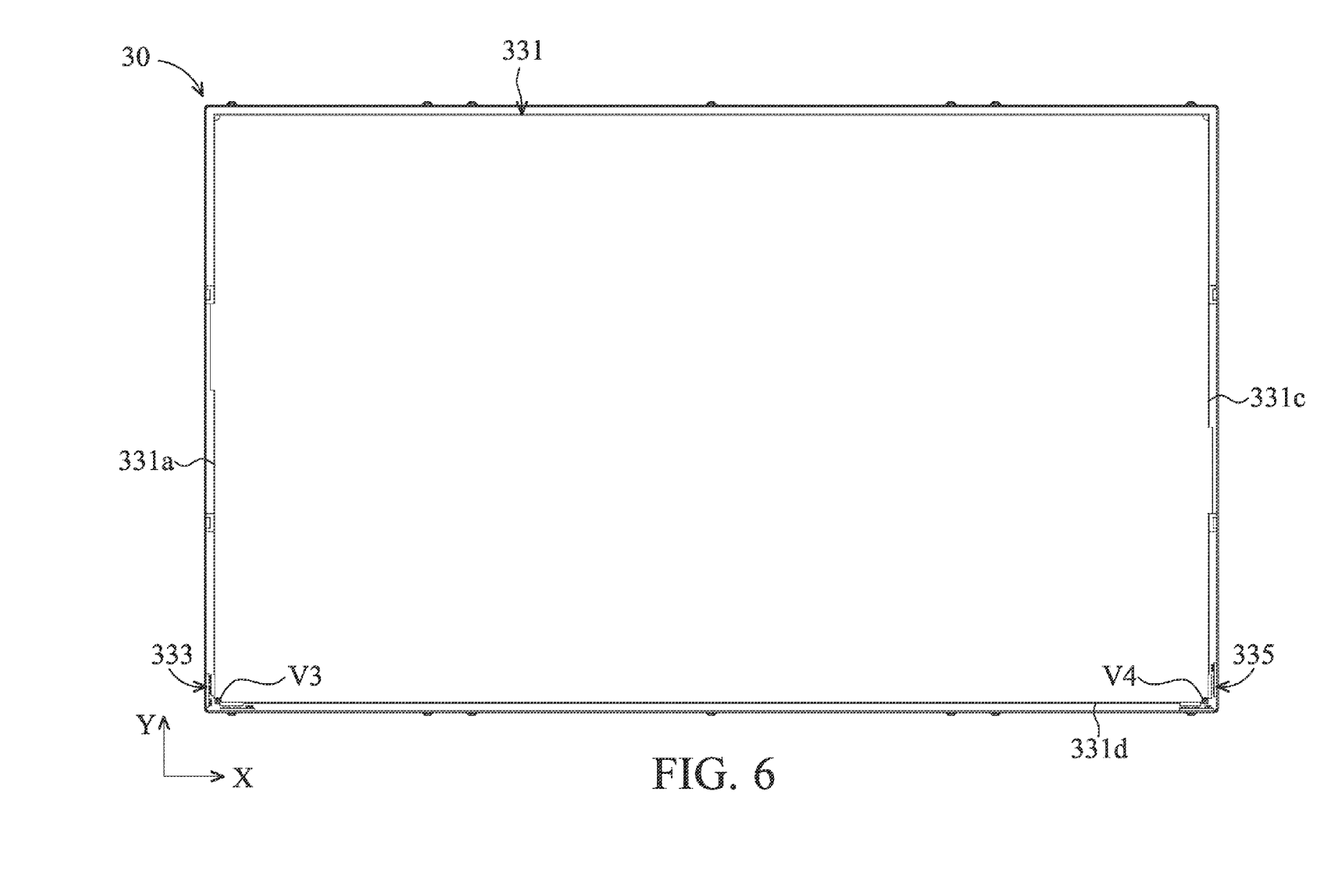
FIG. 6 is a schematic view of a liquid crystal display device of a second embodiment of the present disclosure.

Referring to FIG. 6, a schematic view of partial elements of a second embodiment of a liquid crystal display device 30 is shown. The liquid crystal display device 30 includes a light guide plate 331, a first light source device 333 and a second light source device 335. Since the features of the light guide plate 331 are similar to the light guide plate 231, the features of the light guide plate 331 will not be elaborated for brevity. The first lighting device 233 is disposed at two sides of the intersection corner V3 of the first side surface 231a and the fourth side surface 231d and faces the first side surface 231a and the fourth side surface 231d. The second light source device 235 is disposed at two sides of the intersection corner V4 of the third side surface 231c and the fourth side surface 231d and faces the third side surface 231c and the fourth side surface 231d.

Figure 7:
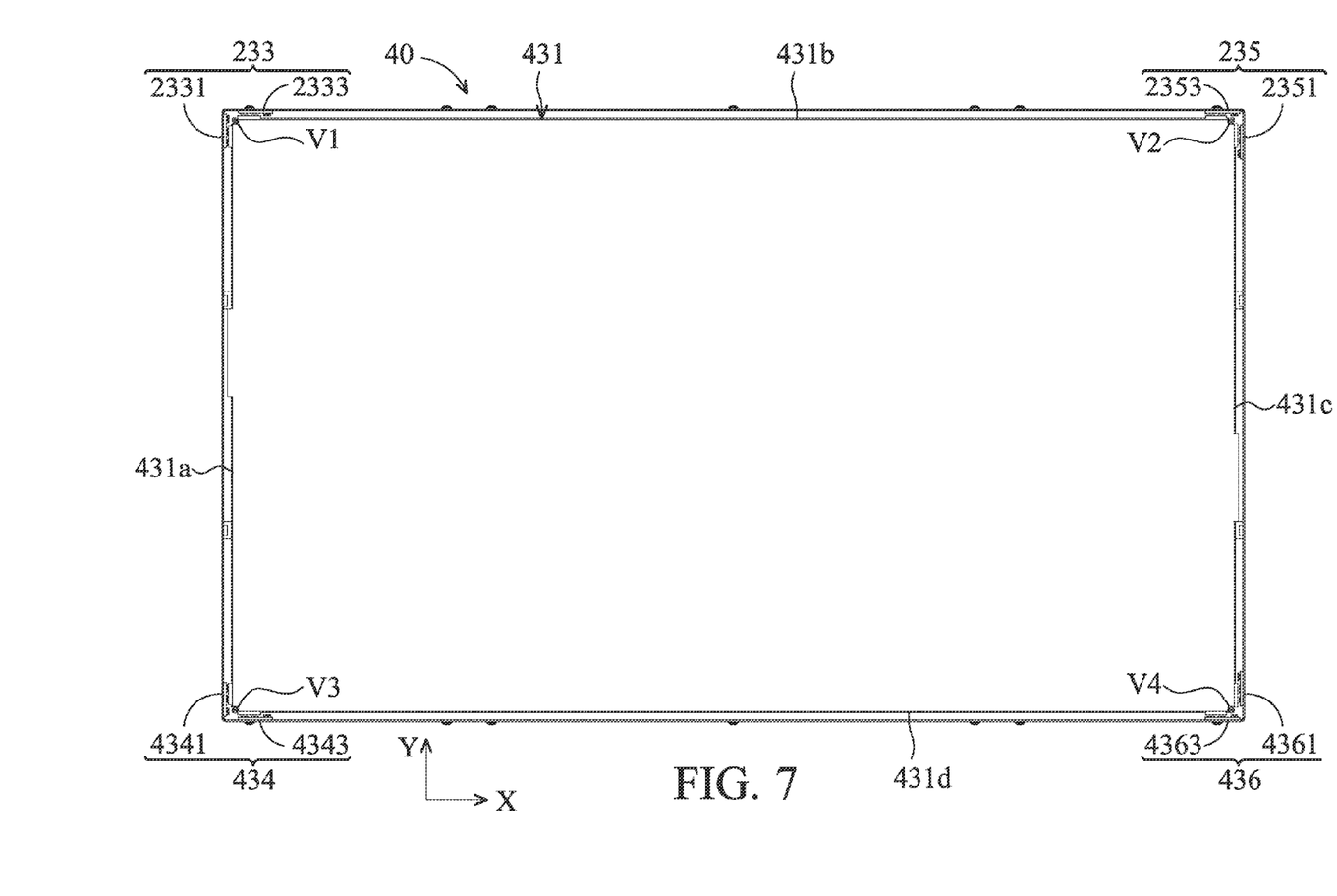
FIG. 7 is a schematic view of a liquid crystal display device of a third embodiment of the present disclosure.

Referring to FIG. 7, a schematic view of partial elements of a third embodiment of a liquid crystal display device 40 is shown. Compared with the liquid crystal display device 20, the liquid crystal display device 40 further includes a third lighting device 434 and a fourth lighting device 436. Since the features of the light guide plate 431 of the embodiment are similar to the light guide plate 231, the features of the light guide plate 431 will not be elaborated for brevity.

The third lighting device 434 is disposed at two sides of the intersection corner V3 of the first side surface 431a and the fourth side surface 431d and includes a third longitudinal plate 4341 and a third horizontal plate 4343. Light sources, disposed on the third longitudinal plate 4341, face the light incident surface of the first side surface 431a, and light sources, disposed on the third horizontal plate 4343, face the light incident surface of the fourth side surface 431d. The fourth lighting device 436 is disposed at two sides of the intersection corner V4 of the third side surface 431c and the fourth side surface 431d and includes a fourth longitudinal plate 4361 and a fourth horizontal plate 4363. Light sources, disposed on the fourth longitudinal plate 4361, face the light incident surface of the third side surface 431c, and light sources, disposed on the fourth horizontal plate 4363, face the light incident surface of the fourth side surface 431d.

Figure 8:
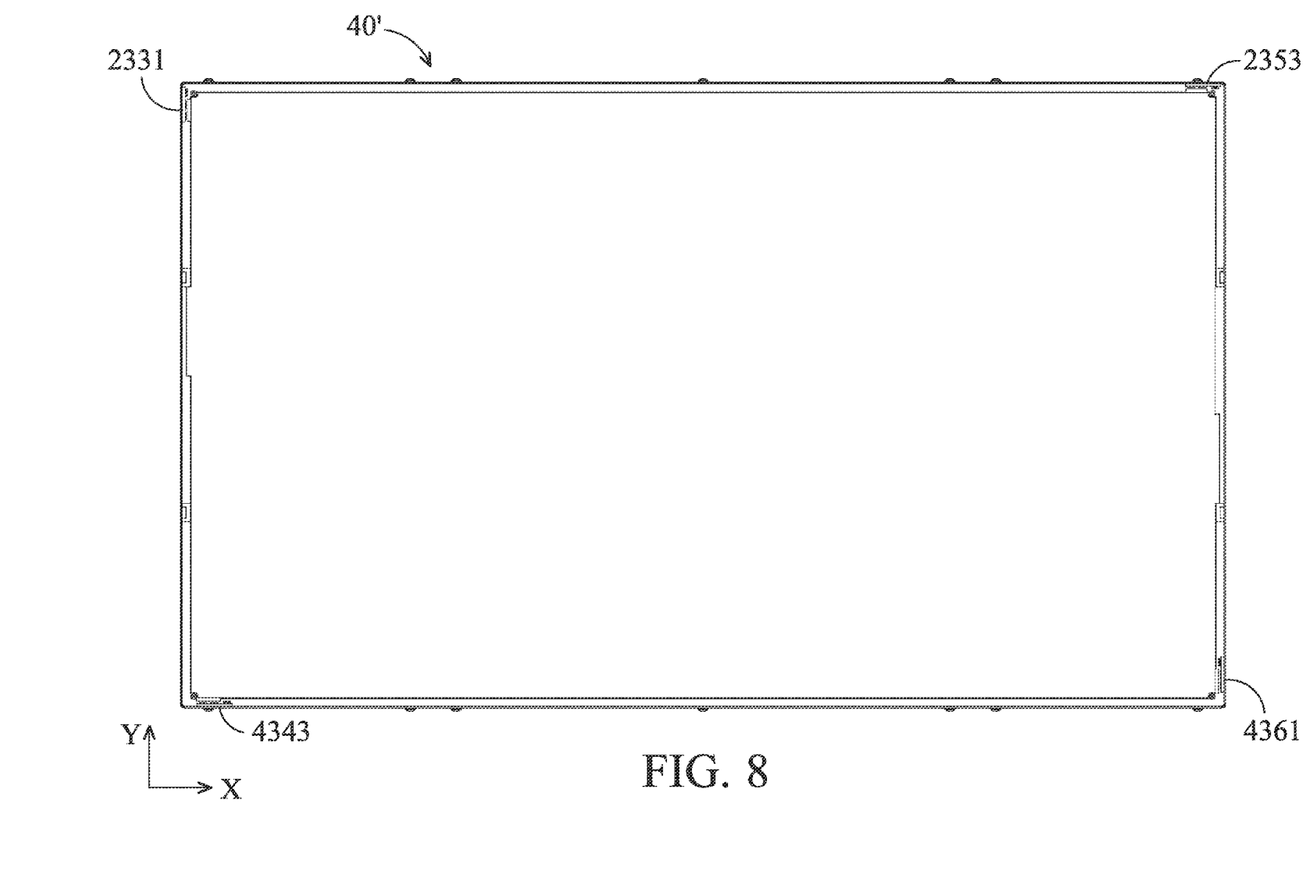
FIG. 8 is a schematic view of a liquid crystal display device of a fourth embodiment of the present disclosure.

Referring to FIGS. 7 and 8, a schematic view of partial elements of a fourth embodiment of a liquid crystal display device 40' is shown in FIG. 8. The number of light sources may be further reduced while the illuminance of the liquid crystal display device 40' at the display area is not changed. In the embodiment shown in FIG. 8, compared with the liquid crystal display device 40, the first horizontal plate 2333, the second longitudinal plate 2351, the third longitudinal plate 4341 and the fourth horizontal plate 4363 are removed from the liquid crystal display device 40'.

The number of light sources in the liquid crystal display device of the present disclosure may be further reduced without changing the illuminance of the liquid crystal display device at the display area; thus, the problem in the prior art backlight module which includes a large number of light sources can be resolved.

While the invention has been described by way of example and in terms of preferred embodiment, it is to be understood that the invention is not limited thereto. On the contrary, it is intended to cover various modifications and similar arrangements (as would be apparent to those skilled in the art). In addition, the number of light sources in practice is selected according to different demands, for example, one or more than one LED facing the side surfaces of the light guide plate may be used.

What is claimed is:

1. A backlight module, comprising:
   a light guide plate, having a first side surface, a second side surface and a third side surface, wherein the first side surface is opposite to the third side surface, and the second side surface is orthogonal to the first and third side surfaces;
   a first light source device, disposed at two sides of an intersection corner of the first and second side surfaces and facing the first and second side surfaces;
   a second light source device, disposed at two side surfaces of an intersection corner of the second and third side surfaces and facing the second and third side surfaces; and
   a positioning structure,
   wherein a recess is formed at the intersection corner of the first and second side surfaces, and the recess has a first side wall extending along a first direction perpendicular to the first side surface and a second side wall extending along a second direction perpendicular to the second side surface, and the positioning structure is disposed in the recess.

2. The backlight module as claimed in claim 1, wherein the first lighting device comprises:
   a first longitudinal plate, facing the first side surface;
   a first horizontal plate, facing the second side surface; and
   a plurality of first light sources, wherein each of the first longitudinal plate and the first horizontal plate has at least one of the first light sources disposed thereon; and
   the second light source device comprises:
   a second longitudinal plate, facing the third side surface;
   a second horizontal plate, facing the second side surface; and
   a plurality of second light sources, wherein each of the second longitudinal plate and the second horizontal plate has at least one of the second light sources disposed thereon.

3. The backlight module as claimed in claim 1, wherein each of the first, second and third side surfaces comprises a light incident surface configured for receiving light, and a length of each light incident surface of the first, second and third side surfaces is less than half of a total length of the corresponding first, second and third side surfaces.

4. The backlight module as claimed in claim 1, further comprising a third lighting device and a fourth lighting device, wherein the light guide plate further comprises a fourth side surface, opposite to the second side surface and orthogonal to first and third side surfaces, wherein the third lighting device is disposed at two sides of an intersection corner of the first and fourth side surfaces and faces the first and fourth side surfaces, and the fourth lighting device is disposed at two sides of an intersection corner of the third and fourth side surfaces and faces the third and fourth side surfaces.

5. The backlight module as claimed in claim 1, further comprising a plurality of printed dots dispersed on a bottom surface of the light guide plate, wherein a distribution density of the printed dots at an area that is located at a substantial center of the first and third side surfaces and proximate to the second side surface is higher than a distribution density of the printed dots at an area that is located proximate to the first or third side surfaces.

6. The backlight module as claimed in claim 1, further comprising a plurality of reflective covers surrounding the external side of the first and second light source devices.

7. A backlight module, comprising:
a light guide plate, having a first side surface, a second side surface, a third side surface and a fourth side surface, consecutively arranged end to end in that order, wherein the first side surface is opposite to the third side surface, and the second side surface is opposite to the fourth side surface; and
a positioning structure,
wherein a recess is formed at an intersection corner of the first and second side surfaces, and the recess has a first side wall extending along a first direction perpendicular to the first side surface and a second side wall extending along a second direction perpendicular to the second side surface, and the positioning structure is disposed in the recess,
wherein in the vicinities of interconnection corners of the first, second, third and fourth side surfaces, the first, second, third and fourth side surfaces respectively comprises a light incident surface configured for receiving light, wherein a length of each light incident surface of the first, second, third and fourth side surfaces is less than half of a total length of the corresponding first, second, third and fourth side surfaces.

8. The backlight module as claimed in claim 7, wherein the length of light incident surfaces of each of the first, second, third and fourth side surfaces is less than one-sixth of the total length of the corresponding first, second, third and fourth side surfaces.

9. A liquid crystal display device, comprising:
a liquid crystal panel; and
a backlight module, comprising:
a light guide plate, having a first side surface, a second side surface and a third side surface, wherein the first side surface is opposite to the third side surface, and the second side surface is orthogonal to the first and third side surfaces;
a first light source device, disposed at two sides of an intersection corner of the first and second side surfaces and facing the first and second side surfaces;
a second light source device, disposed at two sides of an intersection corner of the second and third side surfaces and facing the second and third side surfaces; and
a positioning structure,
wherein a recess is formed at the intersection corner of the first and second side surfaces, and the recess has a first side wall extending along a first direction perpendicular to the first side surface and a second side wall extending along a second direction perpendicular to the second side surface, and the positioning structure is disposed in the recess.

10. The liquid crystal display device as claimed in claim 9, wherein the second side surface is relative to the long side of the liquid crystal display device, and the first and third side surfaces are respectively perpendicular to the second side surface.

* * * * *